(12) United States Patent
Arimilli et al.

(10) Patent No.: US 6,212,605 B1
(45) Date of Patent: Apr. 3, 2001

(54) EVICTION OVERRIDE FOR LARX-RESERVED ADDRESSES

(75) Inventors: Ravi Kumar Arimilli, Austin; John Steven Dodson, Pflugerville; Jerry Don Lewis, Round Rock; Derek Edward Williams, Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/829,577

(22) Filed: Mar. 31, 1997

(51) Int. Cl.$^7$ .................................................. G06F 12/00
(52) U.S. Cl. ............................. 711/133; 711/3; 711/118
(58) Field of Search ..................................... 711/128, 133, 711/135, 144, 145, 3, 118, 154

(56) References Cited

U.S. PATENT DOCUMENTS

| | | | |
|---|---|---|---|
| 4,910,656 | * | 3/1990 | Scales, III et al. .................... 711/118 |
| 5,155,824 | * | 10/1992 | Edenfield .............................. 711/118 |
| 5,367,660 | * | 11/1994 | Gat et al. ............................. 711/118 |
| 5,428,761 | * | 6/1995 | Herlihy ................................. 711/118 |
| 5,454,093 | * | 9/1995 | Abdulhafiz et al. ................... 395/460 |
| 5,526,510 | * | 6/1996 | Akkary et al. ....................... 395/460 |
| 5,594,886 | * | 1/1997 | Smith et al. .......................... 395/463 |
| 5,623,627 | * | 4/1997 | Witt ..................................... 395/449 |
| 5,737,752 | * | 4/1998 | Hilditch ................................ 711/133 |
| 5,778,430 | * | 7/1998 | Ish et al. ............................... 711/133 |
| 5,781,926 | * | 7/1998 | Gaskins et al. ....................... 711/148 |

OTHER PUBLICATIONS

The Cache Memory Book, Jim Handy, pp. 16, 49 and 52, 1993.*
Handy, "Cache Memory Book", 1993, (pp. 1, Cover Page).*

* cited by examiner

Primary Examiner—Tuan V. Thai
(74) Attorney, Agent, or Firm—Richard A. Henkler; Felsman, Bradley, Vaden, Gunter & Dillon, LLP

(57) ABSTRACT

A method of controlling eviction of cache blocks to override eviction of a value which is reserved for a later operation. When a value is loaded into a cache of the processor and is reserved using a lwarx instruction, it sometimes is evicted from the cache due to the need to store other values in the cache set that the value is mapped to. The present invention provides a method of overriding eviction of reserved values by evicting a selected block of the cache which is a block other than the block containing the reserved value. The reserved value is indicated as being reserved by loading a memory address associated with the value into a reservation unit of the cache, and making a reservation flag in the reservation unit active. In two alternative implementations, the eviction mechanism selects a tentative block for eviction and then determines whether the tentative block is the same as the reserved block (and, if so, chooses a different block for the selected block), or preemptively prohibits the reserved block from being chosen as the selected block. The method of the present invention can be implemented with different types of cache replacement controls, e.g., a random mechanism or a least recently used mechanism.

15 Claims, 3 Drawing Sheets

EVICTION OVERRIDE FOR LARX-RESERVED ADDRESSES

BACKGROUND OF THE INVENTION

1. Field of the Invention

The present invention generally relates to computer systems and, more particularly, to a method of controlling evictions from a cache used by a computer processor.

2. Description of the Related Art

The basic structure of a conventional multi-processor computer system 10 is shown in FIG. 1. Computer system 10 has several processing units, two of which, 12a and 12b, are depicted, which are connected to various peripheral devices, including input/output (I/O) devices 14 (such as a display monitor, keyboard, and permanent storage device), memory device 16 (such as random-access memory or RAM) that is used by the processing units to carry out program instructions, and firmware 18 whose primary purpose is to seek out and load an operating system from one of the peripherals (usually the permanent memory device) whenever the computer is first turned on. Processing units 12a and 12b communicate with the peripheral devices by various means, including a generalized interconnect or bus 20. Computer system 10 may have many additional components which are not shown, such as serial and parallel ports for connection to modems or printers. Those skilled in the art will further appreciate that there are other components that might be used in conjunction with those shown in the block diagram of FIG. 1; for example, a display adapter might be used to control a video-display monitor, a memory controller can be used to access memory 16, etc. The computer can also have more than two processing units.

In a symmetric multi-processor (SMP) computer, all of the processing units are generally identical; that is, they all use a common set or subset of instructions and protocols to operate, and generally have the same architecture. A typical architecture is shown in FIG. 1. A processing unit includes a processor core 22 having a plurality of registers and execution units, which carry out program instructions in order to operate the computer. An exemplary processing unit includes the PowerPC™ 604-series processor marketed by International Business Machines Corporation. The processing unit can also have one or more caches, such as an instruction cache 24 and a data cache 26, which are implemented using high-speed memory devices. Caches are commonly used to temporarily store values that might be repeatedly accessed by a processor, in order to speed up processing by avoiding the longer step of loading the values from memory 16. These caches are referred to as "on-board" when they are integrally packaged with the processor core on a single integrated chip 28. Each cache is associated with a cache controller (not shown) that manages the transfer of data between the processor core and the cache memory.

A processing unit 12a can include additional caches, such as cache 30, which is referred to as a level 2 (L2) cache since it supports the on-board (level 1) caches 24 and 26. In other words, cache 30 acts as an intermediary between memory 16 and the on-board caches, and can store a much larger amount of information (instructions and data) than the on-board caches can, but at a longer access penalty. For example, cache 30 may be a chip having a storage capacity of 256 or 512 kilobytes, while the processor may be an IBM PowerPC™ 604-series processor having on-board caches with 64 kilobytes of total storage. Cache 30 is connected to bus 20, and all loading of information from memory 16 into processor core 22 must come through cache 30. Although FIG. 1 depicts only a two-level cache hierarchy, multi-level cache hierarchies can be provided where there are many levels of serially connected caches.

A cache has many "blocks" which individually store the various instructions and data values. The blocks in any cache are divided into groups of blocks called "sets." A set is the collection of blocks that a given memory block can reside in. For any given memory block, there is a unique set in the cache that the block can be mapped into, according to preset mapping functions. The number of blocks in a set is referred to as the associativity of the cache (e.g. 2-way set associative means that, for any given memory block, there are two blocks in the cache that the memory block can be mapped into). However, several different blocks in main memory can be mapped to any given set.

When all of the blocks in a set for a given cache are full and that cache receives a request, whether a "read" or "write," to a memory location that maps into the full set, the cache must "evict" one of the blocks currently in the set. The cache chooses a block by one of a number of means known to those skilled in the art (least recently used (LRU), random, pseudo-LRU, etc.) to be evicted. If the data in the chosen block is modified, that data is written to the next lowest level in the memory hierarchy which may be another cache (in the case of the L1 or on-board cache) or main memory (in the case of an L2 cache, as depicted in the two-level architecture of FIG. 1). However, if the data in the chosen block is not modified, the block is simply abandoned and not written to the next lowest level in the hierarchy. This process of removing a block from one level of the hierarchy is known as an "eviction." At the end of this process, the cache no longer holds a copy of the evicted block.

Another aspect of symmetric multiprocessors which is relevant to the invention relates to the necessity of providing a means of synchronizing the actions of the various processors in a system to allow cooperation among processors working on a task. To achieve this, most modern processors include in their instruction sets explicit instructions to handle synchronization. In particular, the PowerPC™ instruction set provides two instructions known as "lwrx" and "stcx." These instructions come in two forms: "lwarx" and "stwcx" for 32-bit implementations and "ldarx" and "stdcx" for 64-bit implementations. Henceforth, the terms "lwarx" and "stwcx" are used to denote instructions for either implementation (the ldarx and stdcx instructions have essentially the same semantics, with the exception that ldarx and stdcx operate on 8-byte quantities and lwarx and stwcx operate on 4-byte quantities). These instructions serve to build synchronization primitives.

The lwarx instruction loads an aligned 4-byte word of memory into a register in the processor. In addition, lwarx places a "reservation" on the block of memory that contains the word of memory accessed. A reservation contains the address of the block and a flag. This flag is made active, and the address of the block is loaded when a lwarx instruction successfully reads the word of memory referenced. If a reservation is valid (the flag is active) the processor and the memory hierarchy are obligated to cooperatively monitor the entire system for any operation that may write to the block for which the reservation exists. If such a write occurs, the flag in the reservation is reset. The reservation flag is used to control the behavior of the stwcx instruction.

The stwcx instruction is the counterpart to lwarx. The stwcx instruction first determines if the reservation flag is valid. If so, the stwcx instruction performs a store to the 4-byte word of memory specified, sets a condition code register to indicate that the store succeeded, and resets the reservation flag. If, on the other hand, the reservation flag in the reservation is not valid, the stwcx instruction does not perform a store to memory and sets a condition code register indicating that the store failed. The stwcx instruction is often referred to as a "conditional store" due to the fact that the store is conditional on the status of the reservation flag.

The general concept underlying the lwarx/stwcx instruction sequence is to allow a processor to read a memory location, modify the location in some way, and to store the new value to memory while ensuring that no other processor has altered the memory location from the point in time when the lwarx was executed until the stwcx completes. Such a sequence is usually referred to as an "atomic read-modify-write" sequence because the processor was able to read the location, modify it, and then write the new value without interruption by another processor writing to the location. The lwarx/stwcx sequence of operations does not occur as one uninterruptable sequence, but rather, the fact that the processor is able to execute a lwarx and then later successfully complete the stwcx ensures the programmer that the read/modify/write sequence did, in fact, occur as if it were atomic. This atomic property of a lwarx/stwcx sequence can be used to implement a number of synchronization primitives well-known to those skilled in the art.

FIG. 1 depicts two reservation units 32 and 34 which are associated, respectively, with caches 26 and 30. These units contain the reservation, both the address and the flag, and they each "snoop" (monitor) their respective buses 36 and 38 for any write operation within the reservation granule address, and invalidate the associated reservation flag when such an operation is detected (if a reservation-killing operation is detected by a lower-level cache, it is sent up to the higher-level caches). As such, they monitor the buses and respond to bus transactions in a manner similar to the caches themselves. The reservation unit addresses and flags are usually set in one of two general ways. If a processor attempts to issue a lwarx to a memory location whose block is not present in any cache of its memory hierarchy, a read operation is propagated from the processor at the top of the hierarchy through each of the caches in the hierarchy and finally out on the generalized interconnect 20 to be serviced. These read operations are tagged with a special indicator to inform the reservation units in the caches that the read is for a lwarx and that the reservation units should set the address and flag. Alternatively, a processor can issue a lwarx to a memory location in a block already present in the L1 cache 26. This situation is known as an "lwarx hit." In this case, the processor's reservation unit 32 will set its reservation address and flag and will issue a special bus operation known as a lwarx reserve (hereafter RESERVE) on the connection 36 between the L1 and L2 caches. The L2 cache will receive the RESERVE message, which includes the address of the reservation, and will set its reservation address and flag in its reservation unit 34. If other cache levels are present (not shown in FIG. 1), the L2 cache will forward the RESERVE message on to any lower caches in the memory hierarchy, which will repeat the actions taken by the L2 cache, at which point, all the reservation units will be properly set. The process of propagating the RESERVE messages down through all cache levels can take an arbitrary amount of time, in general, depending on availability of the inter-cache connections (e.g., 36 and 38) and the specific details of the particular implementation.

There is one other way that the reservation units can be set. This situation occurs when a block has been partially, but not completely, evicted from a cache hierarchy. For example, assume that the processor core 22 executes a lwarx instruction to an address that is in a block not present in the L1 cache, but is present in the L2 cache. In this case, processor core 22 will issue a read that is marked as a read for a lwarx to the L2 cache. The L2 cache will determine that it has a copy of the block and return this block to the processor core directly. Once the block is returned to the processor core, the processor core updates its reservation address and flag in reservation unit 32. The L2 cache will also set its reservation and send a RESERVE bus operation to any lower level caches to inform them of the reservation. This scenario is merely a combination of the two cases described earlier. In general, a read from the processor core with the lwarx indication propagates down the hierarchy, setting reservation units until it encounters a cache (potentially the L1) that has a copy of the block which satisfies the read. That cache then propagates a RESERVE bus operation down the remainder of the hierarchy to set the remaining reservation units. In this manner, all of the reservation units in the hierarchy are loaded as a result of a lwarx instruction with the proper reservation information and can begin snooping for transactions that write to the reservation granule. This allows the reservation units to reset the reservation flags and prevent a stwcx instruction from completing when the memory location for the reservation could, potentially, have been modified.

One problem with prior-art SMP systems relates to the eviction of a block having a data value which is the subject of a lwarx reservation. Nearly every lwarx instruction is eventually followed by a stwcx instruction (there is no need to place a reservation on a block of memory unless the conditional store operation is to be used later for an atomic read-write sequence). However, a relatively large amount of time can pass between execution of a lwarx instruction and an associated stwcx instruction, for various reasons. During the interim, it is possible that a memory block which has been loaded into a given cache will be evicted as a result of other instructions executed by the processor. This outcome would be undesirable since the memory block would eventually need to loaded into the cache(s) again for execution of the stwcx instruction, creating an unnecessary delay. It is even possible for a reserved block to be evicted, loaded again, and evicted again (several times) before execution of the stwcx. This inefficiency imposes a severe performance degradation and is a limitation of the prior-art systems. It would, therefore, be desirable to devise a more efficient method of implementing lwarx/stwcx semantics, so as to speed up processing of those instructions. It would be particularly advantageous if the method were able to prevent unnecessary evictions of a reserved memory block.

SUMMARY OF THE INVENTION

It is therefore one object of the present invention to provide an improved method of handling cache-entry reservations in a multi-processor computer system.

It is another object of the present invention to provide such a method that speeds up execution of atomic read-write sequences using load-and-reserve (lwarx) and conditional store (stwcx) instructions.

It is yet another object of the present invention to provide such a method that prevents unnecessary evictions of reserved memory blocks.

The foregoing objects are achieved in a method of storing values in a cache for a processing unit, generally comprising the steps of loading a first value into a first block of the set, indicating that the first value is to be reserved, loading at least one other value into another block in the set, evicting a selected block of the set wherein, if the first value is still indicated as being reserved, the selected block is a block other than the first block and, after the evicting step, loading a new value in the selected block. The first value can be indicated as being reserved by loading a memory address associated with the first value into a reservation unit of the cache, and making a reservation flag in the reservation unit active. In two alternative implementations, the evicting step either selects a tentative block for eviction and then determines whether the tentative block is the same as the first block (and, if so, chooses a different block for the selected block), or preemptively prohibits the first block from being chosen as the selected block. The method of the present invention can be implemented with different types of cache replacement controls, e.g., a random mechanism or a least recently used mechanism.

The above as well as additional objectives, features, and advantages of the present invention will become apparent in the following detailed written description.

DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF THE PREFERRED EMBODIMENT

Figure 1:
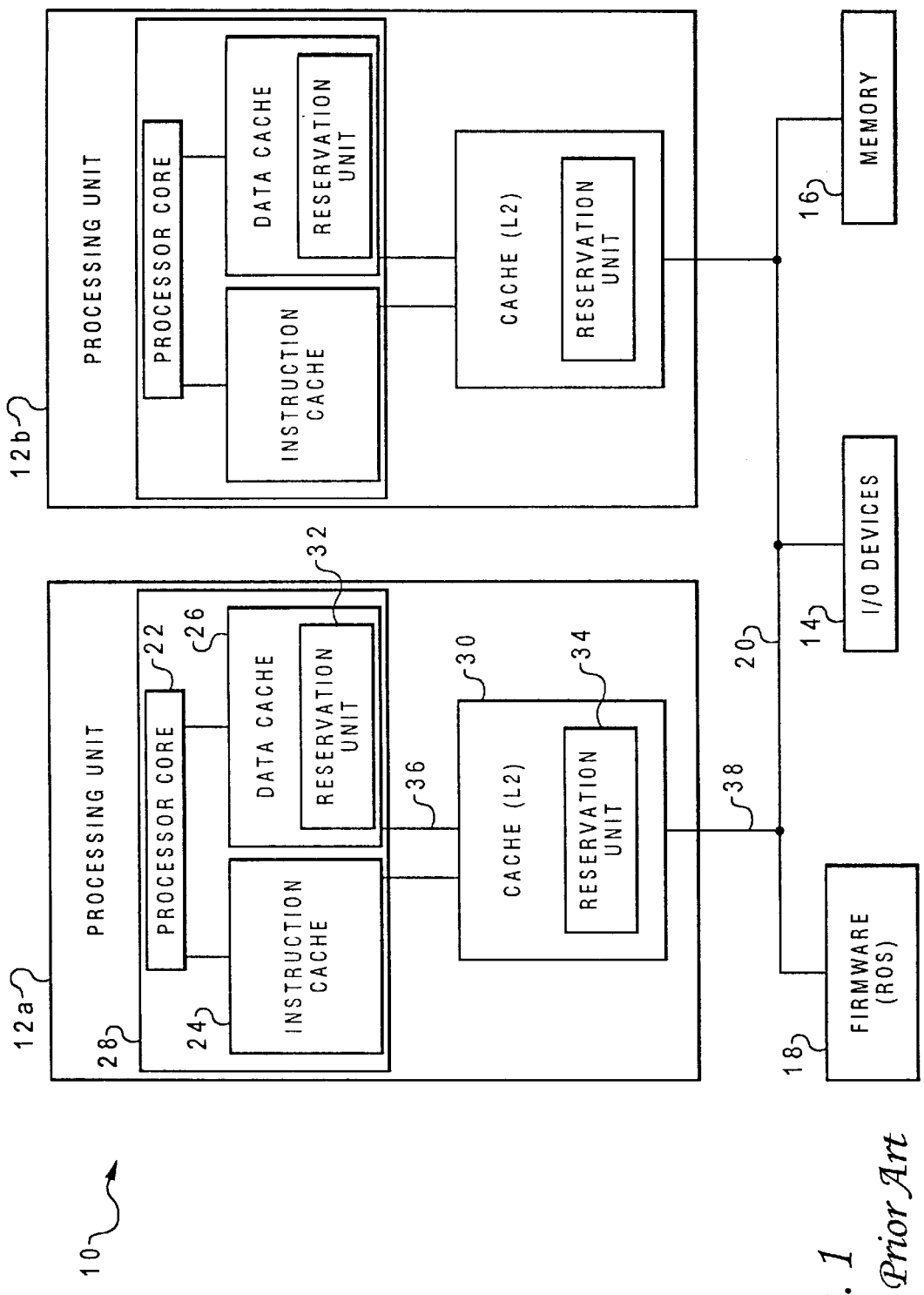
FIG. 1 is a block diagram of a prior-art multi-processor computer system.

The present invention is directed to a method of handling cache reservations and evictions in a multi-processor system, such as the system of FIG. 1, but the present invention could be applied to computer systems that are not necessarily conventional, i.e., they could include new hardware components not shown in FIG. 1, or have a novel interconnection architecture for existing components. Therefore, those skilled in the art will appreciate that the present invention is not limited to the generalized system shown in that figure.

Figure 2:
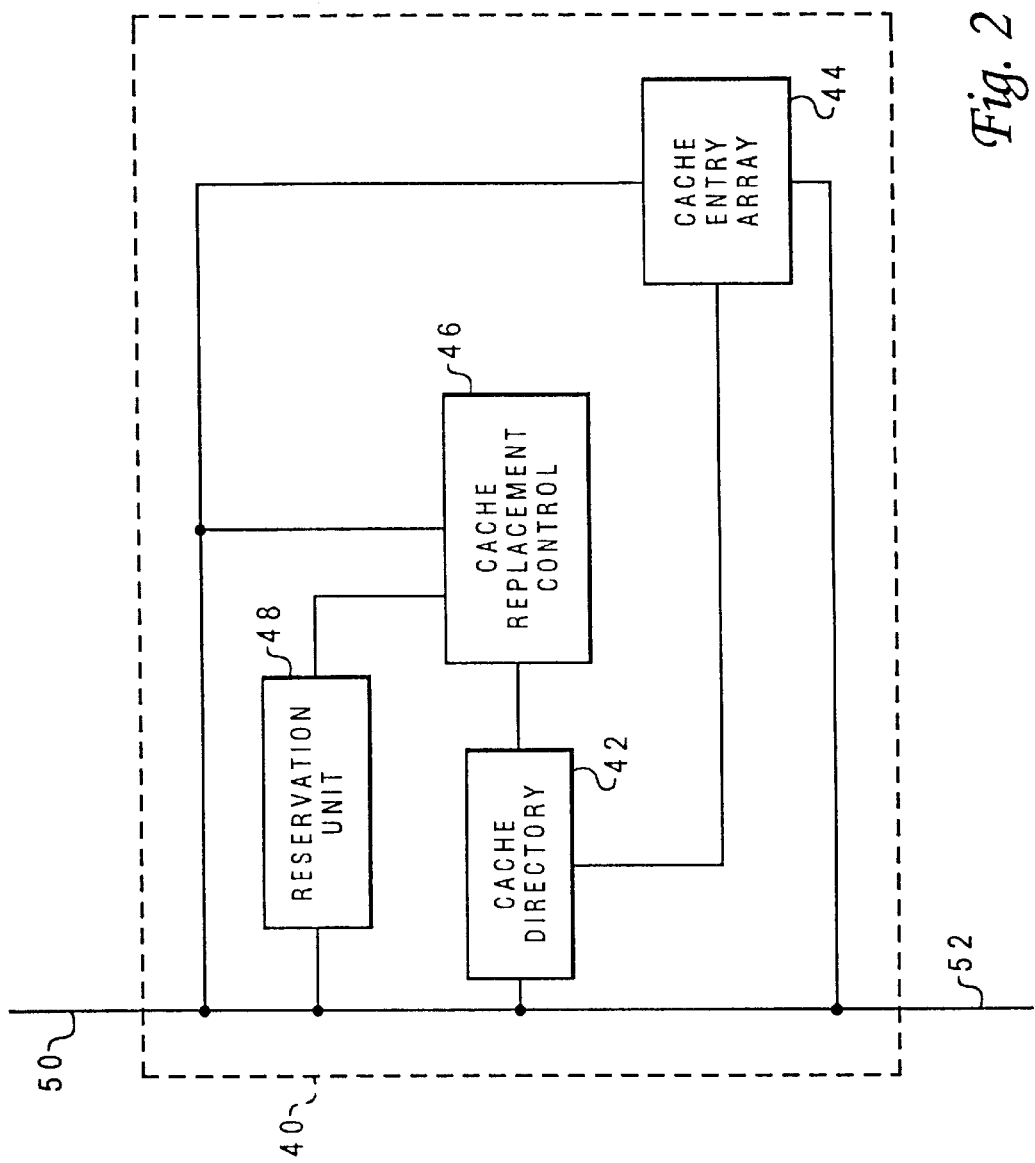
FIG. 2 is a block diagram of a cache for a multi-processor computer system, constructed in accordance with the present invention.

With reference now to FIG. 2, there is depicted one embodiment of a cache unit 40 which is constructed in accordance with the present invention. Cache 40 generally includes a cache directory 42, a cache-entry array 44, a cache replacement control unit 46, and a reservation unit 48. Cache-entry array 44 holds the data values which are to be used by a given processor of the computer system which is associated with cache 40, and cache directory 42 holds the addresses of the memory blocks which correspond to the data values stored in cache-entry array 44. These two components of cache 40 (i.e., cache directory 42 and cache-entry array 44) are generally conventional, and are connected to a first interconnect bus 50 which allows communication with a higher level component (such as a high-level cache or a processor core), and to a second interconnect bus 52 which allows communication with a lower-level component (such as a lower-level cache or the system memory (RAM) via the system bus).

Reservation unit 48 is also generally conventional except that, in this embodiment of cache 40, it is connected to cache replacement control unit 46 for reasons explained further below. As with the prior art, when the target of a load-and-reserve (lwarx) instruction is found in cache 40, the address of the target memory block is stored in reservation unit 48 and the reservation flag is made active. Thereafter, when a conditional store (stwcx) instruction is executed, it first determines if the reservation flag is valid, and if so, the stwcx instruction performs a store to the word of memory specified, sets a condition code register to indicate that the store succeeded, and resets the reservation flag. If, on the other hand, the reservation flag in the reservation is not valid, the stwcx instruction does not perform the store, and sets a condition code register indicating that the store failed. This conditional completion of the stwcx instruction only takes place at the L1 cache level.

Cache-entry array 44 has a plurality of blocks which are divided into sets, as with prior-art cache-entry arrays, and for any given memory block, there is a unique set in the cache that the block will be mapped to, based on preset (conventional) mapping functions. When all of the blocks in a set of cache-entry array 44 are full and cache 40 receives a read or write request to a memory location that maps into the full set, one of the blocks in the full set must be evicted. Cache replacement control unit 46 chooses a block by one of a number of conventional means with the exception that a block containing a reserved address will not be evicted. Cache replacement control unit 46 is made aware of a reservation on a block and overrides any operation that would otherwise evict the reserved block. In this manner, the cache more efficiently handles the reserved memory block since it could potentially be required for a subsequent stwcx command. The number of blocks in a set in cache-entry array 44 can be variable, except that there must be more than one block per set (i.e., the cache must be at least 2-way set associative); otherwise, there will be no alternative block in the set to evict.

The method by which cache replacement control unit 46 overrides the eviction of a reserved block can be influenced by the particular replacement mechanism being used, although the algorithm for replacement and the algorithm for overriding are actually independent. For example, if the replacement mechanism is random, then cache control unit 46 can make an initial random determination of which block in a set is to be evicted, and then determine if that block has a reservation by examining the addresses in reservation unit 48 and cache directory 42. If so, then a new block in the set can be selected, by one of several methods; for example, another random determination may be made in a reiterative fashion until a non-reserved block is selected for eviction, or a simpler approach may be used, such as selecting the next sequential block in the set after the reserved block (generally, a reiterative approach is less desirable since it may take much longer to perform). If a least recently used (LRU) mechanism is employed to select a block for eviction, then the foregoing method may be similarly implemented, i.e., by using the LRU technique and checking any selected block against the reservation address. If a reserved block was tentatively selected, then the next sequential block may be chosen instead, or another block which was not recently used (based on the LRU bit pattern) can be chosen. Alternatively, a preemptive method may be employed; each time a read or write operation occurs for a given set, the address of any reserved block in the set can be resent to the LRU unit (i.e., cache replacement control unit 46) in such a manner as to indicate that the reserved block was most recently used. In this manner, the LRU mechanism will be prohibited from selecting a reserved block. Preemptive techniques can also be applied to random replacement mechanisms.

Cache 40 may be used as an on-board (L1) cache, or as a lower-level cache (e.g., L2). While the construction of cache 40 may be used for only one or a limited number of cache levels in the cache hierarchy, those skilled in the art will appreciate that it is preferable to use this construction for all cache levels so as to maximize the performance benefits.

Figure 3:
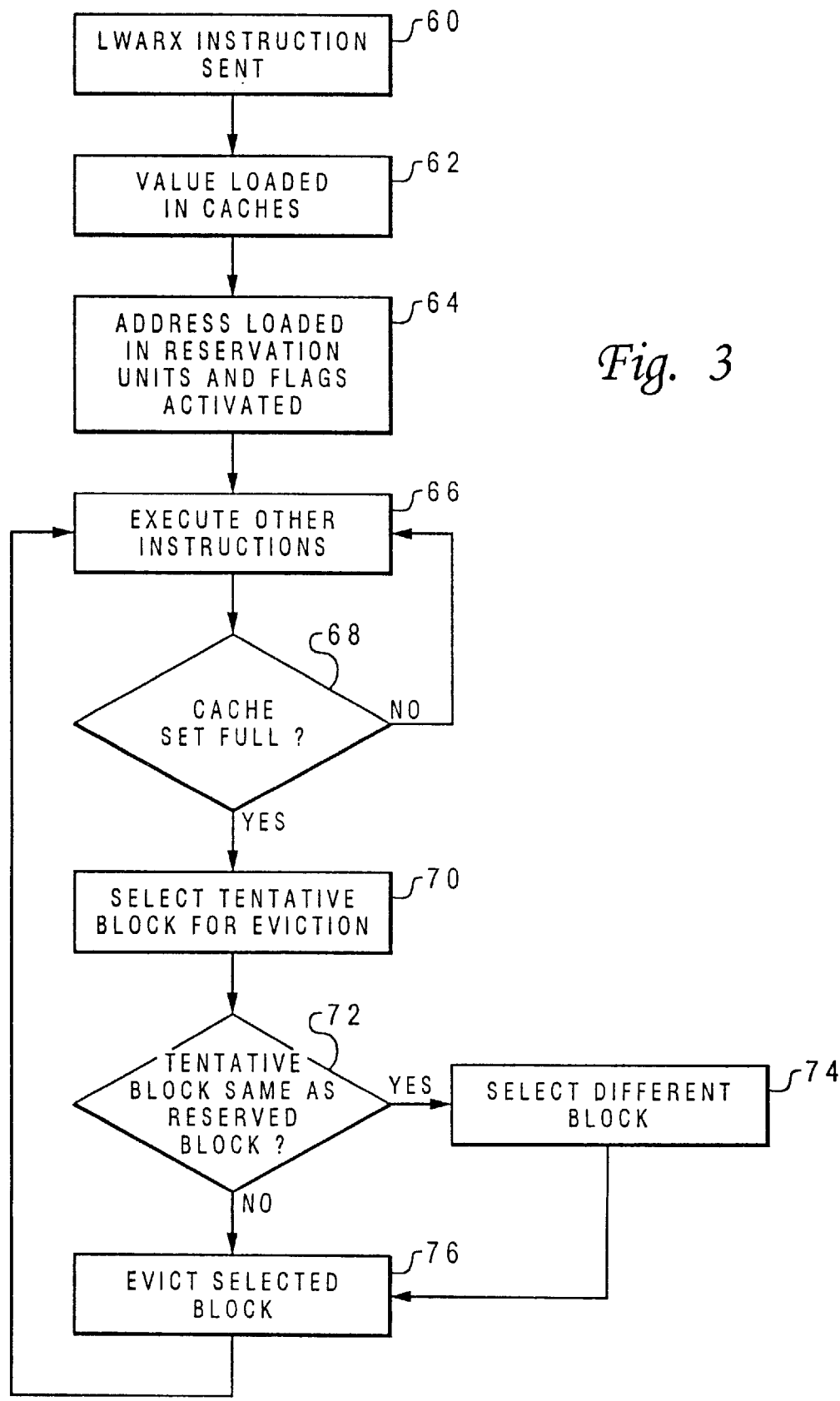
FIG. 3 is a flowchart depicting the steps associated with evicting cache blocks which may contain a reserved address.

The present invention can be further explained with reference to the flowchart of FIG. 3. When a processor first accesses a value to be read with a load-and-reserve instruction (60), that value is placed in all the cache levels, up to the highest-level cache (62). The address of the memory block is placed in the reservation units of each cache, and the reservation flags made active (64). The processor then executes other instructions (66), which may or may not be related to the load-and-reserve cached value. If the set in any cache-entry array holding the reserved value is full, and a new value is required to be stored in that set by the preset mapping function (68), the cache replacement control unit selects one of the blocks for eviction (70). In this example wherein a preemptive mechanism is not used to override eviction of a reserved block, the memory address of the block tentatively selected for eviction is compared against the address of the reserved block (72) and, if they are the same, a different block is selected (74). Once a block has been selected that is not reserved, that value is evicted (pushed down to the next level in the memory hierarchy if the data is modified, or abandoned if the data is not modified), and the new value loaded (76). This process is repeated for as long as the reservation flag is active for the particular cache.

The present invention improves processor performance by avoiding unnecessary evictions of lwarx-reserved addresses which would otherwise have to be reloaded into all caches associated with a given processor, for the subsequent stwcx instruction. In SMP systems where the lwarx/stwcx instructions are executed frequently, this invention allows for higher overall system performance. There may be certain limitations on this technique, however. For example, the PowerPC™ processors also use a "flush" instruction to cause a given block to be removed from the caches of all processing units in a system. When this instruction is executed, all processors must relinquish any copies of the given block. This procedure must be done even if a reservation is held on the block. This operation is different from an eviction, and is known as a "snoop" operation. In this case, the current invention cannot force the cache to retain a copy of the block, and it must be removed from the caches in the system. This result will not prevent proper operation of the system, but rather, will incur a performance penalty later if the block has to be reloaded in the caches for a future stwcx instruction.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method of storing values in a cache for a processing unit of a computer system, the cache having a plurality of blocks for receiving the values, the method comprising the steps of:

loading a first value into a first block of the cache;

indicating that the first value is to be reserved for an atomic read-write sequence;

loading at least one other value into another block in the cache;

evicting a selected block of the cache wherein, if the first value is still indicated as being reserved, the selected block is a block other than the first block; and, after said evicting step, loading a new value in the selected block.

2. The method of claim 1 wherein the first value is indicated as being reserved by:

loading a memory address associated with the first value into a reservation unit of the cache; and making a reservation flag in the reservation unit active.

3. The method of claim 2 further comprising the steps of determining if the reservation flag is still valid and, if so, storing a new value to the first memory block and resetting the reservation flag.

4. The method of claim 1 wherein said evicting step further includes the steps of:

selecting a tentative block for eviction; and determining whether the tentative block is the same as the first block and, if so, choosing a different block for the selected block but, if not, choosing the tentative block for the selected block.

5. The method of claim 4 wherein the cache further includes a cache-entry array containing the blocks, and a cache directory having memory addresses associated with values loaded in the blocks, and said determining step includes the step of comparing a memory address associated with the first value against the addresses in the cache directory.

6. The method of claim 1 wherein said evicting step further includes the step of preemptively prohibiting the first block from being chosen as the selected block.

7. The method of claim 1 wherein:

the blocks in the cache are grouped into sets; and each of said loading steps includes the step of determining a unique set having a block that a given value will be loaded into based on a memory address of the given value and a preset mapping function.

8. The method of claim 1 wherein the cache further includes a replacement unit that chooses the selected block based on a random mechanism.

9. The method of claim 1 wherein the cache further includes a replacement unit that chooses the selected block based on a least recently used mechanism.

10. A method of storing values in a cache for a processing unit of a computer system, the cache having a plurality of blocks for receiving the values, and the blocks being grouped into sets, the method comprising the steps of:

loading a first value into a first block of the cache;

loading a memory address associated with the first value into a reservation unit of the cache used for atomic read-write sequences;

making a reservation flag in the reservation unit active;

loading at least one other value into another block in the cache;

evicting a selected block of the cache wherein, if the first value is still indicated as being reserved, the selected block is a block other than the first block; and, after said evicting step, loading a new value in the selected block;

wherein each of said loading steps includes the step of determining a unique set having a block that a given value will be loaded into based on a memory address of the given value and a preset mapping function.

11. A computer system comprising:

a processor for carrying out program instructions;

a memory device for storing program instructions and data values;

means for interconnecting said processor and said memory device; and a cache connected to said processor, said cache having a plurality of blocks for storing data values used by said processor, and having means for overriding eviction of a block having a reservation for an atomic read-write sequence;

wherein said eviction overriding means preemptively prohibits said block having said reservation from being chosen for eviction.

12. The computer system of claim 11 wherein said cache further has a reservation unit, said reservation unit storing a memory address associated with a block which is to be reserved, and having a reservation flag which is made active to indicate that said block having said reservation is reserved.

13. The computer system of claim 11 wherein:

said blocks in said cache are grouped into sets; and said cache loads a given value into a unique set based on a memory address of the given value and a preset mapping function.

14. The computer system of claim 11 wherein said cache further includes a replacement unit that chooses blocks for eviction based on a least recently used mechanism.

15. The computer system of claim 11 wherein said eviction overriding means preemptively prohibits said block having said reservation from being chosen for eviction by indicating that said block having said reservation was most recently used.

* * * * *